(12) United States Patent
Uesato et al.

(10) Patent No.: US 12,540,781 B2
(45) Date of Patent: Feb. 3, 2026

(54) ATTACHMENT STRUCTURE FOR HEAT EXCHANGER

(71) Applicant: T.RAD CO., LTD., Tokyo (JP)

(72) Inventors: Koji Uesato, Tokyo (JP); Shuhei Matsusaka, Tokyo (JP)

(73) Assignee: T.RAD CO., LTD., Tokyo (JP)

( * ) Notice: Subject to any disclaimer, the term of this patent is extended or adjusted under 35 U.S.C. 154(b) by 279 days.

(21) Appl. No.: 18/019,585

(22) PCT Filed: Jul. 28, 2021

(86) PCT No.: PCT/JP2021/029039
§ 371 (c)(1),
(2) Date: Feb. 3, 2023

(87) PCT Pub. No.: WO2022/030566
PCT Pub. Date: Feb. 10, 2022

(65) Prior Publication Data
US 2024/0255239 A1    Aug. 1, 2024

(30) Foreign Application Priority Data

Aug. 6, 2020 (JP) ................................ 2020-134029

(51) Int. Cl.
| | |
|---|---|
| *F28D 21/00* | (2006.01) |
| *F01P 3/20* | (2006.01) |
| *F28D 9/00* | (2006.01) |
| *F28F 3/08* | (2006.01) |
| *F28F 9/12* | (2006.01) |

(52) U.S. Cl.
CPC ................. *F28F 9/12* (2013.01); *F01P 3/20* (2013.01); *F01P 2060/045* (2013.01)

(58) Field of Classification Search
CPC ...... F28F 9/10; F28F 9/12; F28F 3/005; F28F 3/08; F28F 3/083; F28F 3/086; F28F 9/002; F28F 9/0075; F28F 2280/06; F28D 9/0043; F28D 9/005; F28D 2021/0089; F16L 23/18; F16L 23/162; F16L 23/22; F16J 15/002; F16J 15/021; F16J 15/062
See application file for complete search history.

(56) References Cited

U.S. PATENT DOCUMENTS

| | | | |
|---|---|---|---|
| 6,224,058 B1 * | 5/2001 | Drebing ................. | F16J 15/025 277/316 |
| 6,394,507 B1 * | 5/2002 | Baker ..................... | F16L 23/20 285/368 |

(Continued)

FOREIGN PATENT DOCUMENTS

| | | |
|---|---|---|
| JP | 63-74973 | 5/1988 |
| JP | 2002-332818 A | 11/2002 |
| JP | 2011-69511 A | 4/2011 |

*Primary Examiner* — Frantz F Jules
*Assistant Examiner* — Jason N Thompson
(74) *Attorney, Agent, or Firm* — Norris McLaughlin, P.A.

(57) ABSTRACT

In an attachment structure in which a flange 2 of a heat exchanger and a casing 3 form metal touch 12, a protruding step surface is formed at the hole edge portion of the flow path hole of the flange of the heat exchanger, which projects toward the casing side from the surface of the metal touch. Thereby, the flange is firmly press-contacted with the casing, and the fluid is prevented from leaking out of the hole edge of the flow path hole.

2 Claims, 5 Drawing Sheets

(56) References Cited

U.S. PATENT DOCUMENTS

| | | | | |
|---|---|---|---|---|
| 2001/0030043 A1* | 10/2001 | Gleisle | ................... | F28D 9/005 |
| | | | | 165/167 |
| 2007/0125529 A1* | 6/2007 | Matsudaira | ............. | F28F 13/00 |
| | | | | 165/167 |
| 2008/0191474 A1* | 8/2008 | Kotz | ..................... | F16J 15/062 |
| | | | | 285/276 |
| 2009/0120625 A1* | 5/2009 | Janezich | .................. | F28F 9/10 |
| | | | | 165/173 |
| 2017/0175599 A1* | 6/2017 | Ariyama | ................ | F01M 5/002 |

\* cited by examiner

ATTACHMENT STRUCTURE FOR HEAT EXCHANGER

TECHNICAL FIELD

The present invention relates to an attachment structure for use in attaching to a casing via a flange on an edge portion of a heat exchanger optimized for oil coolers for vehicles.

BACKGROUND ART

Until now, in a heat exchanger for oil coolers, many dish-shaped plates are stacked to form a core and a flange is arranged on an edge portion of the core, and the heat exchanger is attached to a casing via an O-ring provided for the flange. Then, oil having been cooled with the heat exchanger is returned to the casing.

In this case, an inlet and an outlet of oil of the heat exchanger and the casing are sealed by using a metal touch in which polished planes contact with each other.

SUMMARY OF INVENTION

Technical Problem

In an attachment structure for a heat exchanger as an oil cooler, when the flange thereof and casing were sealed with a metal touch, there was a case where leak occurred at the oil inlet or the outlet thereof depending on finishing precision of the seal surface to degrade heat exchange performance of the oil cooler.

Accordingly, the present invention is directed to prevent surely oil leak at a flange of a heat exchanger as an oil cooler.

Solution to Problem

The present invention according to a first aspect thereof is an attachment structure for a heat exchanger in which a flange 2 is provided on one end of a heat exchanger 1 and the flange 2 is connected with a surface of a casing 3, wherein:
 a surface of the flange 2 has a belt region 4 constituted of an annular plane, and an annular groove 5 in which an O-ring 9 for seal is stored is formed in the belt region 4;
 at least one flow path hole 6 is formed inside the belt region 4 while a case side flow path hole 7 is provided for the casing 3 facing the flow path hole 6;
 each of portions on a surface of the casing 3 in contact with the flange 2 is formed flat on one face, and the flange 2 and the casing 3 form metal touch 12 in the belt region 4; and
 a hole edge portion of the flow path hole 6 of the flange 2 is formed in a protruding step surface 8 projecting toward the casing 3 side from a surface of the metal touch 12.

The present invention according to a second aspect is the attachment structure for the heat exchanger according to the first aspect, wherein:
 in the belt region 4, an outside belt 4a is formed outside the annular groove 5, an inside belt 4b is formed inside thereof, and the protruding step surface 8 is provided including the inside belt 4b.

The present invention according to a third aspect is the attachment structure for the heat exchanger according to the first aspect or the second aspect, wherein:
 the protruding step surface 8 is not lower than 0.02 mm and not higher than 0.3 mm relative to the surface of the metal touch 12, and flatness thereof is not greater than 0.1 mm.

Advantageous Effects of Invention

In the first aspect of the invention, the flange 2 and the casing 3 form the metal touch 12,
 and the hole edge portion of the flow path hole 6 of the flange 2 is formed in the protruding step surface 8 projecting toward the casing 3 side from the surface of the metal touch 12.

Hereby, the flange 2 can be press-contacted to the casing 3 more strongly than the surface of the metal touch 12 by the amount of the protruding step surface 8 to prevent a fluid from leaking out of a hole edge of the flow path hole 6. Thereby, heat exchange performance can be improved.

In the second aspect of the invention, the protruding step surface 8 is provided at the inside belt 4b of the belt region 4.

Hereby, the protruding step surface 8 can lie close to the O-ring 9 to prevent leak of a fluid more effectively.

In the third aspect of the invention, the protruding step surface 8 is formed to be not lower than 0.02 mm and not higher than 0.3 mm relative to the surface of the metal touch 12, and to have the flatness of not greater than 0.1 mm.

Hereby, an attachment structure for a heat exchanger without fluid leak which is manufactured easily can be provided. In other words, leak of a fluid does not occur in the above-described numerical ranges.

DESCRIPTION OF EMBODIMENTS

Next, embodiments of the present invention will be explained on the basis of the drawings.

Figure 1A:
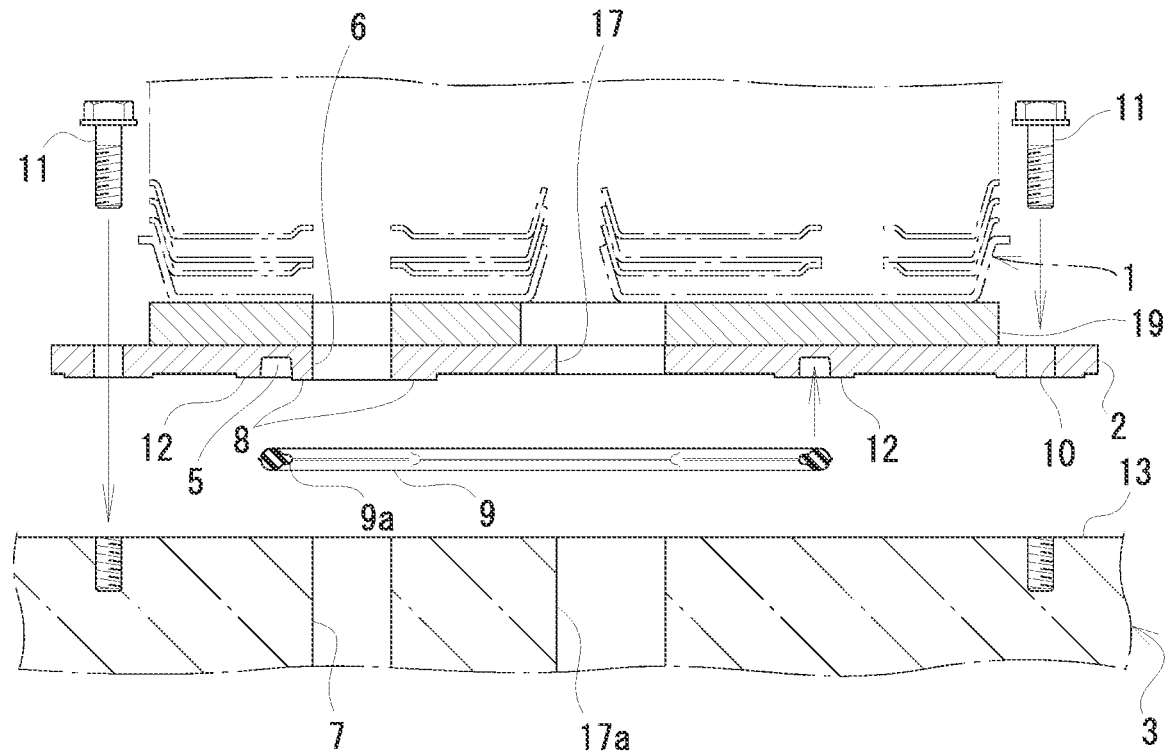
FIG. 1A illustrates an exploded perspective view in a main part of a heat exchanger according to the present invention.
Figure 1B:
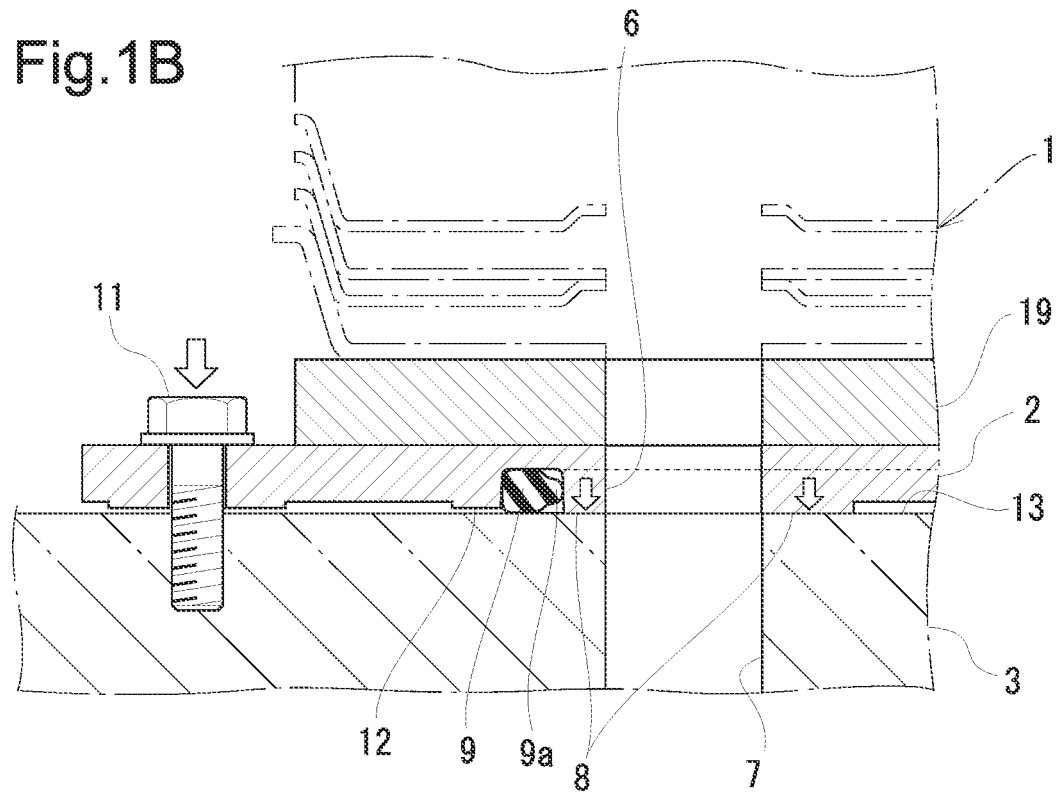
FIG. 1B illustrates an attaching condition thereof and shows a condition before a bolt 11 is screwed.

FIG. 1A illustrates a main part vertical cross-sectional view of attachment structure for a heat exchanger of the present invention and FIG. 1B a partial enlarged view thereof, FIG. 1B showing a condition before a bolt 11 is screwed.

Figure 2A:
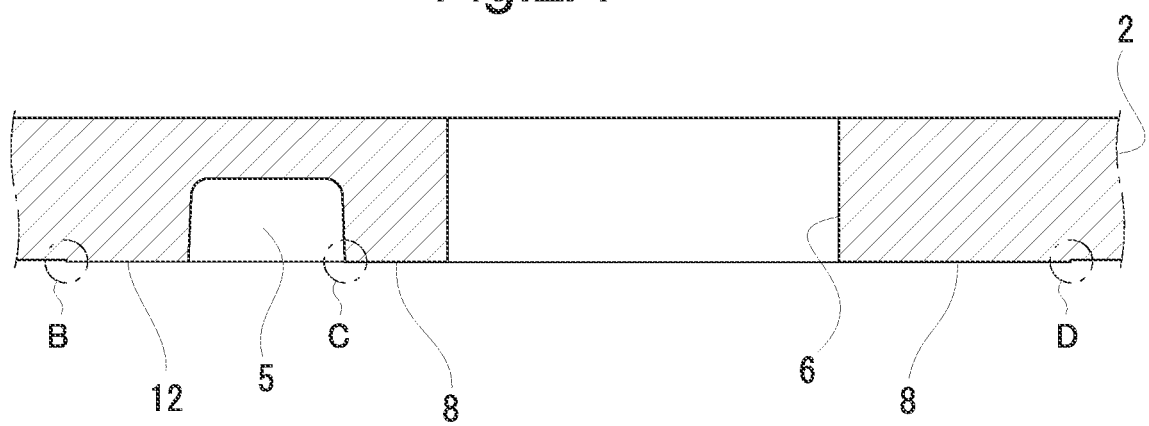
FIG. 2A illustrates a view seen along a II-II arrow in FIG. 3 in a main part vertical cross-sectional view of the flange 2 of the attachment structure of the present invention.
Figure 2B:
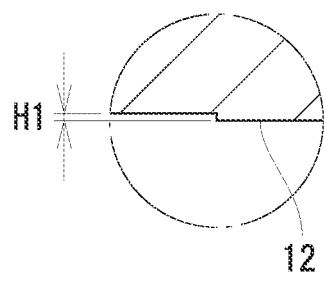
FIG. 2B illustrates enlarged views of B portion in FIG. 2A.
Figure 2C:
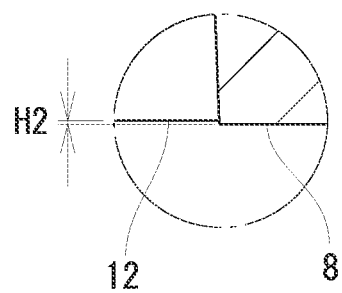
FIG. 2C illustrates enlarged views of C portion in FIG. 2A.

Moreover, FIG. 2A illustrates a main part vertical cross-sectional view of a flange 2 of the present invention, FIG. 2B illustrates enlarged views of B portion in FIG. 2A, FIG. 2C illustrates enlarged views of C portion in FIG. 2A, and FIG.

Figure 3:
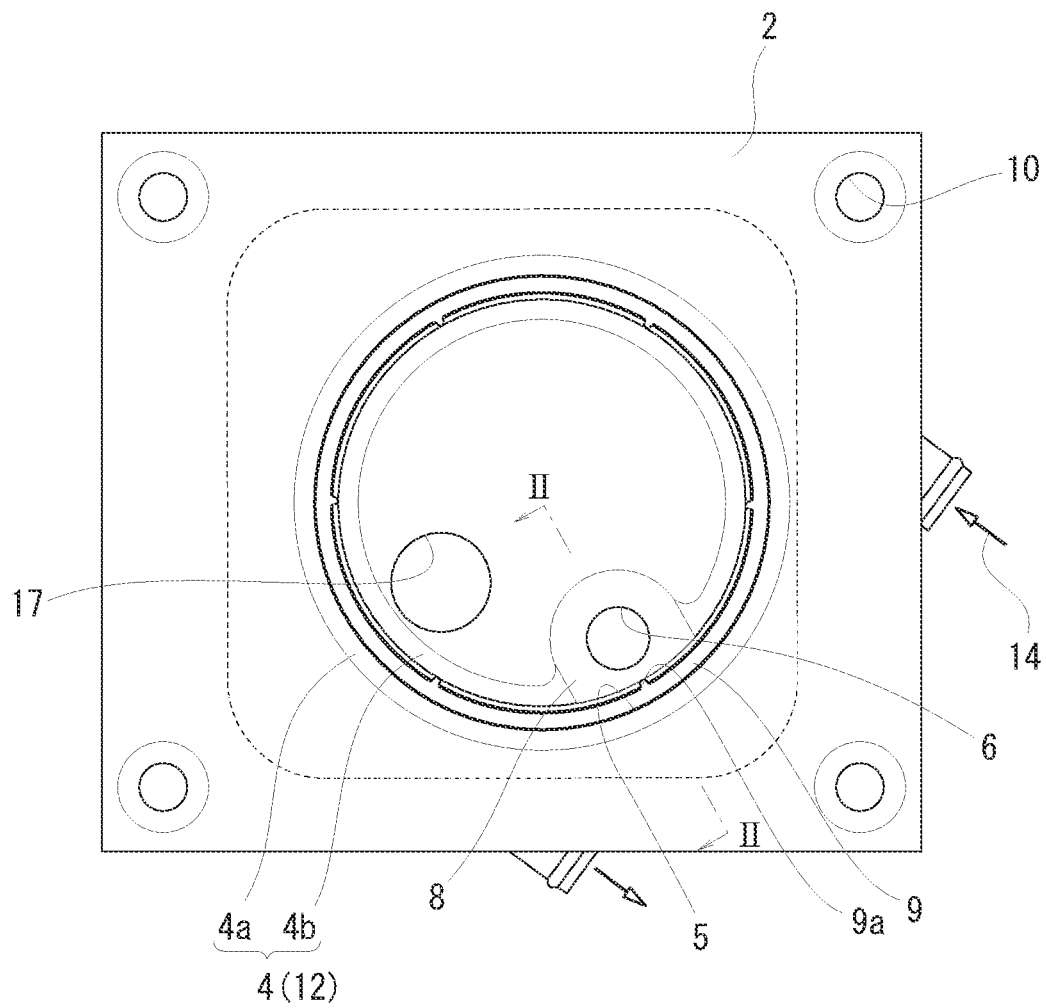
FIG. 3 illustrates a backside plan view of the flange 2 according to the present invention.
Figure 4:
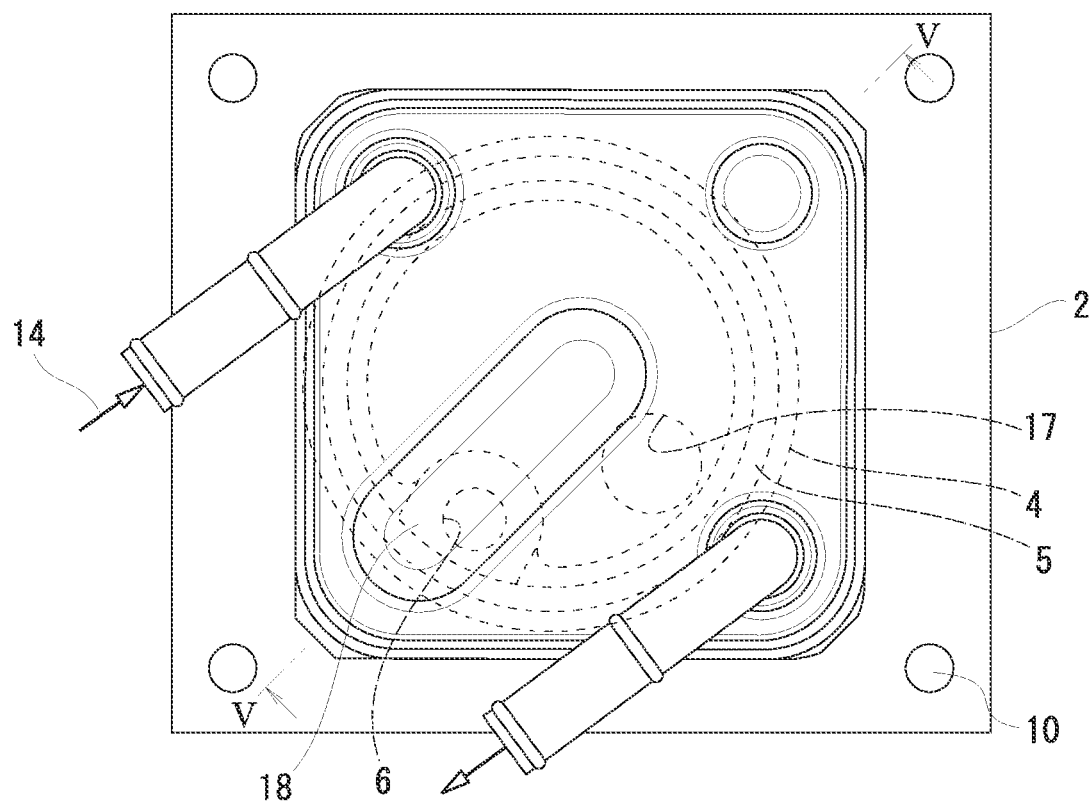
FIG. 4 illustrates a plan view of a heat exchanger according to the present invention.
Figure 5:
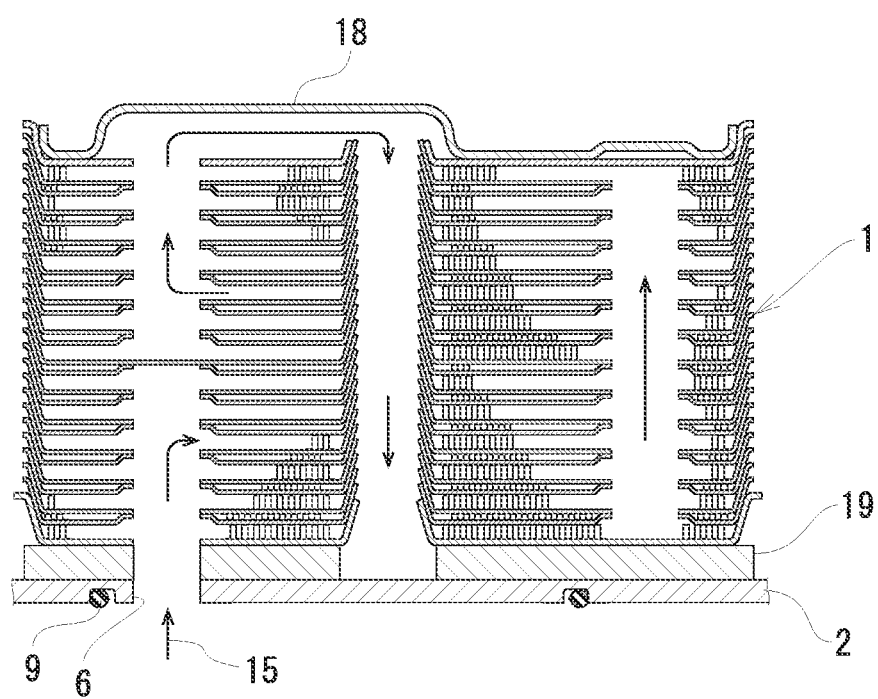
FIG. 5 illustrates a cross-sectional view seen along a V-V arrow in FIG. 4.

2D illustrates enlarged views of D portion in FIG. 2A; FIG. 3 illustrates a backside plan view of the flange 2 of the present invention; FIG. 4 illustrates a plan view of the heat exchanger of the present invention; FIG. 5 illustrates a cross-sectional view seen along a V-V arrow in FIG. 4; and FIG. 6 illustrates a rough sketch of the attachment structure for the heat exchanger of the present invention.

Figure 6:
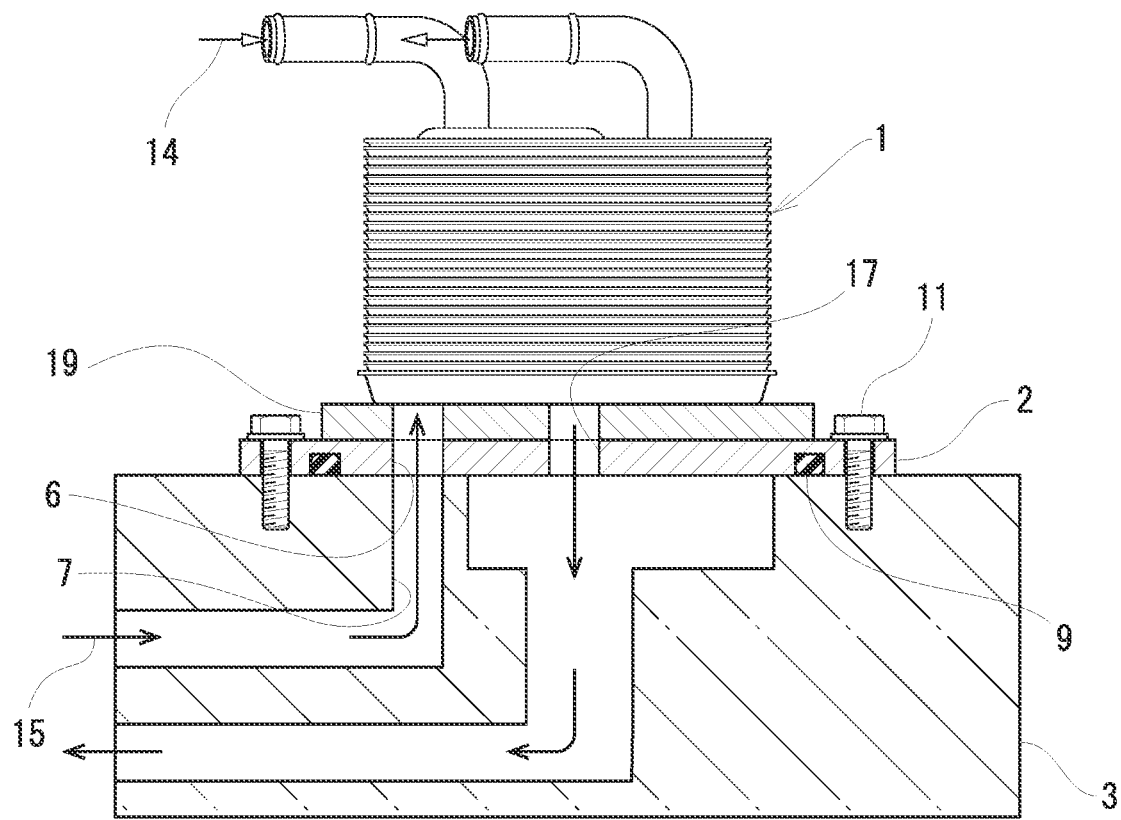
FIG. 6 illustrates an explanatory view showing a condition in which the heat exchanger is attached to the casing 3 via the flange 2.

This heat exchanger 1 has, as shown in FIG. 6, a core in which many dish-shaped plates are stacked. At the lower end of the core, the flange 2 is arranged, and the flange 2 is connected liquid-tightly with a casing 3 via an O-ring 9. The flange 2 of the heat exchanger seals an inlet and an outlet of oil with one O-ring 9.

Then, oil 15 is guided from a case side flow path hole 7 of the casing 3 to the inside of the heat exchanger 1 via the flange 2.

In the heat exchanger 1, as shown in FIG. 5, an oil flow path and a cooling water flow path are stacked alternately. The oil 15 having flown from a flow path hole 6 of the flange 2 snakes through the oil flow path of the heat exchanger 1. Then, heat exchange is conducted between cooling water 14 shown in FIG. 4 and the oil 15 shown in FIG. 5.

The oil 15 having been cooled is returned to the casing 3 from an oil outlet 17 shown in FIG. 4.

A characteristic of the present invention lies in the attachment structure of the flange 2 and the casing 3, which is provided at the edge portion of the heat exchanger 1.

In this example, a comparatively thick base 19 is connected to the lowermost plate of the core of the heat exchanger 1, and via the base 19, the heat exchanger 1 is connected with the flange 2. The base 19 and the flange 2 are joined integrally.

Here, on the underside of the flange 2 (surface on the connection side with the casing 3), as shown in FIG. 3, an annular groove 5 is formed on the surface thereof. The annular groove 5 is provided within an annually formed belt region 4. With regard to the belt region 4, an outside belt 4a is formed on the outer side relative to the center of the flange 2, and an inside belt 4b is formed on the inner side.

Further, the outside belt 4a, as shown in FIG. 2B, projects toward the casing 3 side slightly by the amount of H1 from the plane on the underside of the flange 2. Thereby, in FIG. 1B, a surface of the metal touch 12 is formed with the plane of the casing 3. Here, the metal touch means that surfaces of metal contact with each other.

Further, to the inside belt 4b, as shown in FIG. 2C, a protruding step surface 8, which projects toward the casing 3 side slightly by the amount of H2 from the outside belt 4a and the inside belt 4b, is formed. The projection amount is, on the basis of a plane of the outside belt 4a, not lower than 0.02 mm and not higher than 0.3 mm from the plane. Furthermore, the flatness of the protruding step surface 8 is not more than 0.1 mm.

At the center of the protruding step surface 8, the flow path hole 6 is drilled.

Figure 2D:
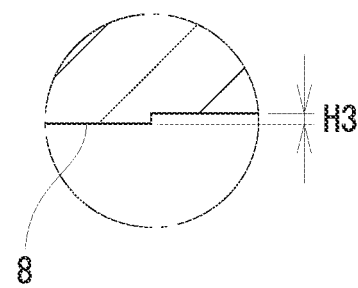
FIG. 2D illustrates enlarged views of D portion in FIG. 2A.

For reference, the protruding step surface 8 in FIG. 2D will project toward the casing 3 side by an amount of H3 from the underside plane of the flange 2. This projection amount of H3 is approximately the same as a combined projection amount of the H1 and H2.

In the flange 2, one or more bolt holes 10 have been drilled and the bolt 11 is inserted thereinto. A hole edge portion of the bolt hole 10 slightly projects in the same direction as that of the outside belt 4a, the inside belt 4b. The projection amount of the plane of the hole edge portion of the bolt hole 10 and the projection amounts of planes of the outside belt 4a, the inside belt 4b are formed approximately flat on one face, excluding the protruding step surface 8.

The case side flow path hole 7 is provided for the casing 3 aligned with the flow path hole 6 working as the inlet of oil. Furthermore, a case side outlet 17a is provided to be aligned with the oil outlet 17 of the flange 2.

Each portion of a connection surface 13 of the casing 3 in contact with the flange 2 is formed flat on one face, and the connection surface 13 faces the surface of the metal touch 12 of the flange 2.

Then, when the flange 2 is brought in contact with the casing 3, the protruding step surface 8 contacts the connection surface 13 of the casing 3.

In FIG. 1B, when the flange 2 of the heat exchanger 1 is placed on the connection surface 13 of the casing 3, which is formed flat on one face, the protruding step surface 8 contacts the connection surface 13. When the bolt 11 is screwed in this condition, the surface of the metal touch 12 of the flange 2 is press-contacted with the connection surface 13 of the casing 3 to enhance seal performance of the O-ring 9. The pressure-contact amount thereof is the difference between the protruding step surface 8 and a pair of belt regions 4.

As the result, leak of the oil in the flow path hole 6 to the outside is prevented.

According to an experiment, when the projection amount of the protruding step surface 8 slightly projecting toward the casing 3 side from the inside belt 4b was set, on the basis of the plane of the outside belt 4a, to be not lower than 0.02 mm and not higher than 0.3 mm from the plane and the flatness of the protruding step surface 8 was set to be not more than 0.1 mm, and the flow rate of the oil was set to be a low flow rate, a medium flow rate or a high flow rate, the heat release amount of the heat exchanger increased by 3.2% to 5.0% while oil leak did not occur.

Moreover, when the structure of the protruding step surface 8 was introduced, a conventional press method could be employed without modification.

INDUSTRIAL APPLICABILITY

The present invention can be utilized as a heat exchanger for a transmission or an engine of vehicles etc., and in particular it is suitable to be used as an oil cooler thereof.

The invention claimed is:

1. An attachment structure for a heat exchanger in which a flange is provided on one end of a heat exchanger and the flange is connected with a connection surface of a casing, the flange and the casing being both made of metal, wherein:
    the connection surface of the casing is flat;
    a surface of the flange has a belt region constituted of an annular plane, and an annular groove in which an O-ring for sealing is received is formed in the belt region;
    at least one flow path hole is formed inside the belt region while a case side flow path hole is provided for the casing facing the flow path hole;
    each of portions on a surface of the casing in contact with the flange is formed flat on one face, and the flange and the casing are each made of metal and are in metal-to-metal contact in the belt region; and
    hole edge portions of the flow path hole of the flange are formed in protruding step surfaces of the flange projecting toward the connection surface of the casing so as to first come into metal-to-metal contact with the connection surface of the casing when the flange is supported by the connection surface of the casing without being tightly fastened thereto, wherein:

in the belt region, an outside belt region is formed outside the annular groove, an inside belt region is formed inside the annular groove, and the protruding step surfaces are in the inside belt region;

the flange is supported on the connection surface of the casing only by metal-to-metal contact of the protruding step surfaces with the connection surface of the casing when the flange is not tightly connected to the connection surface of the casing;

fasteners are provided to fasten the flange to the casing; and an annular portion of the flange contiguous with an outer edge of the annular groove is so configured that a surface thereof first comes into metal-to-metal contact with the connection surface of the casing upon tightening of the fasteners thereby to tightly fasten the flange to the casing.

2. The attachment structure for the heat exchanger according to claim 1, wherein:

the protruding step surfaces protrude not less than 0.02 mm and not more than 0.3 mm, and flatness of the protruding step surfaces is not greater than 0.1 mm.

* * * * *